(12) United States Patent
Goumy et al.

(10) Patent No.: US 11,247,667 B2
(45) Date of Patent: Feb. 15, 2022

(54) ELECTRONIC PARKING ASSISTANCE DEVICE FOR A MOTOR VEHICLE

(71) Applicant: VALEO COMFORT AND DRIVING ASSISTANCE, Créteil (FR)

(72) Inventors: Jean-Claude Goumy, Créteil (FR); Frédéric Gehin, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 323 days.

(21) Appl. No.: 16/082,722

(22) PCT Filed: Mar. 6, 2017

(86) PCT No.: PCT/EP2017/055129
§ 371 (c)(1),
(2) Date: Feb. 19, 2019

(87) PCT Pub. No.: WO2017/153307
PCT Pub. Date: Sep. 14, 2017

(65) Prior Publication Data
US 2019/0184980 A1    Jun. 20, 2019

(30) Foreign Application Priority Data

Mar. 7, 2016  (FR) ....................................... 1651896

(51) Int. Cl.
*B60W 30/06*      (2006.01)
*H01Q 1/32*       (2006.01)
(Continued)

(52) U.S. Cl.
CPC ............ *B60W 30/06* (2013.01); *B60W 10/20* (2013.01); *B62D 15/0285* (2013.01);
(Continued)

(58) Field of Classification Search
CPC .. B60W 30/06; B60W 2420/42; B60W 10/20; H01Q 1/3291; H01Q 1/3266;
(Continued)

(56) References Cited

U.S. PATENT DOCUMENTS 10,599,155 B1 *  3/2020  Konrardy ........... B60W 60/0011
10,800,405 B2 * 10/2020  Marcial-Simon ..........................
                                                G01C 21/3602
(Continued)

FOREIGN PATENT DOCUMENTS

EP   2295281 A1   3/2011
WO   92/16392 A2  10/1992

OTHER PUBLICATIONS

International Search Report issued in International Application No. PCT/EP2017/055129, dated May 24, 2017 (4 pages).
(Continued)

*Primary Examiner* — Donald J Wallace
(74) *Attorney, Agent, or Firm* — Osha Bergman Watanabe & Burton LLP (57) ABSTRACT

The invention relates to an electronic parking assistance device (1) for a motor vehicle (10), comprising: a housing (2) provided with an antenna (3), a camera (6) that is contained, at least in part, in the housing, and a control unit (7) that is contained in the housing and is connected to said antenna. According to the invention, the housing is provided with at least one other antenna (4) that is connected to the control unit, and this control unit is suitable for selecting each antenna and for sending and receiving signals exclusively via the selected antenna.

13 Claims, 2 Drawing Sheets

(51) Int. Cl.
*H01Q 21/24* (2006.01)
*B60W 10/20* (2006.01)
*B62D 15/02* (2006.01)
*G06K 9/00* (2022.01)
*G08C 17/02* (2006.01)
*H01Q 1/24* (2006.01)
*H04W 4/40* (2018.01)
*B60R 1/12* (2006.01)

(52) U.S. Cl.
CPC ......... *G06K 9/00805* (2013.01); *G08C 17/02* (2013.01); *H01Q 1/241* (2013.01); *H01Q 1/3233* (2013.01); *H01Q 1/3266* (2013.01); *H01Q 1/3291* (2013.01); *H01Q 21/24* (2013.01); *B60R 2001/1253* (2013.01); *B60W 2420/42* (2013.01); *H04W 4/40* (2018.02)

(58) Field of Classification Search
CPC ...... H01Q 21/24; H01Q 1/3233; H01Q 1/241; G06K 9/00805; G08C 17/02; H04W 4/40; B60R 2001/1253; B62D 1/00; B62D 15/0285
See application file for complete search history.

(56) References Cited

U.S. PATENT DOCUMENTS

| | | | |
|---|---|---|---|
| 2004/0121820 A1* | 6/2004 | Unno | B60R 1/06 455/569.2 |
| 2006/0205368 A1* | 9/2006 | Bustamante | H01Q 21/29 455/101 |
| 2009/0075617 A1* | 3/2009 | Walker | H04B 7/0808 455/277.1 |
| 2011/0137491 A1* | 6/2011 | Self | E02F 5/145 701/2 |
| 2012/0309326 A1* | 12/2012 | Maguire | H04B 5/02 455/73 |
| 2014/0132767 A1* | 5/2014 | Sonnabend | G06K 9/00476 348/148 |
| 2014/0222252 A1 | 8/2014 | Matters et al. | |
| 2014/0288774 A1* | 9/2014 | Morita | G08G 1/096783 701/36 |
| 2015/0048996 A1* | 2/2015 | Aubert | H01Q 1/362 343/895 |
| 2015/0097738 A1 | 4/2015 | Sugimoto et al. | |
| 2017/0033449 A1* | 2/2017 | Talty | H01Q 21/28 |
| 2017/0192428 A1* | 7/2017 | Vogt | G05D 1/0038 |
| 2017/0323135 A1* | 11/2017 | Kang | G06F 3/044 |
| 2018/0088577 A1* | 3/2018 | Kim | H04M 1/72463 |
| 2020/0282974 A1* | 9/2020 | Diessner | B60W 10/02 |

OTHER PUBLICATIONS

Written Opinion issued in International Application No. PCT/EP2017/055129, dated May 24, 2017 (5 pages).

* cited by examiner

ELECTRONIC PARKING ASSISTANCE DEVICE FOR A MOTOR VEHICLE

TECHNICAL FIELD TO WHICH THE INVENTION RELATES

The present invention relates generally to improving the quality of the wireless communications between a motor vehicle and a mobile terminal (typically a cellphone).

It relates more particularly to an electronic parking assistance device for a motor vehicle. It relates also to a motor vehicle equipped with such a device.

The invention relates also to a method for communication between an electronic device and a mobile terminal.

It is particularly advantageously applicable in the control of the automatic parking of a motor vehicle by means of a mobile terminal held by a user situated outside of the vehicle.

TECHNOLOGICAL BACKGROUND

The parking of a motor vehicle is often a source of problems and anxiety for the driver.

This is why parking assistance systems have been developed, that make it possible, for example, to emit a sound signal when the rear of the vehicle approaches an obstacle or to display on a screen present in the vehicle interior, images filmed in real time by a camera situated at the rear of the vehicle.

To further simplify the parking of the vehicle, systems have recently been developed that allow the vehicle to be parked autonomously, that is to say automatically, without the intervention of the driver. These autonomous systems operate in particular through the use of cameras situated on each side of the vehicle and which inform the vehicle of the position of the parking space and of the presence of any obstacles.

In the case where the parking space is so small that, once the vehicle is parked, the driver will no longer be able to open the doors, provision is made for the driver to be able to be located outside of the vehicle while the vehicle is parked.

Since these automatic parking systems are not infallible, and because the driver is still legally responsible for the maneuver, a solution has been developed to allow the user to stop the maneuver from his or her smartphone if he or she perceives a danger.

This solution consists in requiring the user to exert, on the touchscreen of his or her smartphone, a pressure to authorize the vehicle to be parked, so that he or she can stop this parking operation by simply relaxing the pressure that he or she is exerting on the touchscreen of his or her smartphone.

For the control of this function, the vehicle generally has an embedded antenna allowing it to communicate with the mobile terminal.

For cost reasons, this antenna is usually placed on the electronic circuit board itself of the central computer of the vehicle. However, to ensure a better communication between the vehicle and the mobile terminal, it is known practice to place this antenna elsewhere, for example in the central interior console of the vehicle or in the headrests.

It has unfortunately been found that, even when placed thus, the antenna does not always make it possible to ensure an adequate communication quality, so that the parking operation is stopped inadvertently when the vehicle no longer receives any signal originating from the smartphone of the user.

The first reason explaining this problem is that an antenna exhibits a non-isotropic radiation pattern. To put it another way, the power transmitted by the antenna is not the same in all the directions of space. Likewise, the power received by the antenna varies according to the direction from which the signal originates. Also, by way of example, the measured electromagnetic power will not be the same depending on whether the holder of the mobile terminal is located 10 meters in front of the vehicle or 10 meters behind the vehicle.

The second reason is that the signal is subject to strong variations because of the environment in which the antenna is located, variations which cannot be predicted or evaluated. Thus, when the antenna is situated in the interior of the vehicle, the signal is reflected several times before being received by the antenna. The signal is, moreover, attenuated on passing through the various obstacles that it encounters, in particular on passing through the windows which are increasingly opaque for electromagnetic signals.

Consequently, the quality of the exchanged signal is very greatly degraded when the vehicle is moved relative to the user.

OBJECT OF THE INVENTION

In order to remedy the abovementioned drawbacks of the prior art, the present invention proposes to combine the parking assistance cameras and the antennas, so as to ensure a good reception of the signals transmitted by the mobile terminal, regardless of the position of the user relative to the vehicle.

More particularly, there is proposed, according to the invention, an electronic parking assistance device to be installed in a motor vehicle, comprising:
- a housing which bears two distinct antennas,
- a camera which is housed at least partly in the housing, and
- a control unit which is housed in the housing, which is connected to the antennas, and which is adapted to select each antenna and to transmit and receive signals exclusively via the selected antenna.

The invention offers multiple advantages.

First of all, the arrangement of the antennas on the external housing of the camera makes it possible to reduce the cost of production of the assembly since it is no longer necessary to provide, on one side, a camera equipped with its own housing, and, on the other side, an antenna equipped with its own support.

This arrangement also facilitates the connection of the control unit to the communication network of the vehicle, since the connection already provided between the camera and the communication network is exploited for that.

The housing of the camera is also well suited to supporting the antennas insofar as it has a sufficient size for the size of the antenna to allow the latter to pick up signals in the desired frequencies (typically 2.4 GHz).

The use of two antennas, oriented differently, obviously makes it possible to optimize the radiation pattern of the assembly. By allowing the control unit to exchange signals via just one or other of the antennas it is possible to maximize the power emitted on each antenna (compared to the case where the control unit would exchange signals simultaneously through the two antennas). Consequently, the range of the device is substantially increased.

It will also be noted that the housing of the camera is generally situated outside of the interior of the vehicle, which makes it possible to place the antennas outside of the interior. In this way, the signals received by the antennas are less damped than if the antenna were situated in the interior. This arrangement thus ensures a better communication quality between the mobile terminal and the vehicle.

Finally, to allow the automatic parking of the vehicle, four cameras are generally used, situated respectively at the front, at the rear and on the sides of the vehicle. By then using four electronic devices according to the invention, it is thus possible to multiply the number of antennas and therefore guarantee excellent communication between the motor vehicle and the mobile terminal, whatever their relative positions.

Other advantageous and nonlimiting features of the electronic device according to the invention are as follows:
- the housing bears a third antenna which is connected to the control unit so that the control unit can select it to transmit and receive signals;
- the housing has several orthogonal faces in pairs and the antennas are respectively situated on said orthogonal faces;
- wired connection means are provided from the camera to a first communication network and from said control unit to a second communication network, combined with or distinct from the first communication network; and
- each antenna takes the form of a rectilinear radiating strand.

The invention also relates to a motor vehicle comprising two external rear view mirrors, a central computer, two electronic devices as mentioned above, respectively housed in the two external rear view mirrors, and a communication network which connects the central computer and the control units of the two electronic devices to one another.

Advantageously, each external rear view mirror comprises, in addition to the electronic device, a mirror or a rear view camera making it possible to acquire images from the rear of the motor vehicle.

Preferentially, the motor vehicle comprises at least one other electronic device situated at the front or at the rear of the vehicle.

The invention relates also to a communication method from an electronic device as mentioned above to a mobile terminal, comprising two distinct phases, namely:
- a waiting phase during which the control unit of the electronic device transmits successive association attempt requests via, alternately, each of its antennas, which is followed by, as soon as a response signal is received by a first of its antennas,
- a communication phase during which the control unit communicates with the mobile terminal by using, at least initially, exclusively said first antenna.

Preferentially, during the communication phase:
- the control unit transmits successive control requests via each of its antennas other than the first antenna, then, when a replica signal is received by a second of its antennas,
- the control unit determines the gain of the instantaneous response signal received from the mobile terminal via said first antenna,
- the control unit compares the gain of the instantaneous response signal and the gain of the replica signal, then
- the control unit continues the communication with the mobile terminal via said second antenna only if the gain of the replica signal is substantially greater than the gain of the instantaneous response signal.

Advantageously, when the vehicle comprises several electronic devices as mentioned above and, while in the communication phase, the control unit of a first of the electronic devices communicates with the mobile terminal via a first of its antennas:
- the control unit of each electronic device transmits successive control requests via each of its antennas other than the first antenna, then, when a replica signal is received by a second of the antennas of the second electronic device,
- the control unit of the first electronic device determines the gain of the instantaneous response signal received from the mobile terminal via said first antenna,
- the control unit of at least one of the electronic devices compares the gain of the instantaneous response signal and the gain of the replica signal, then
- the control unit of the second electronic device continues the communication with the mobile terminal via said second antenna only if the gain of the replica signal is substantially greater than the gain of the instantaneous response signal.

Advantageously, during the communication phase, there is provided a step of estimation of the position of the mobile terminal, as a function of which antenna is used and as a function at least of the gain of the instantaneous response signal.

The invention relates finally to a method for interactive control of the automatic parking of a motor vehicle in a parking space by means of a mobile terminal, said motor vehicle comprising means for commanding the orientation of the wheels of the motor vehicle, means for controlling a power train of the motor vehicle, at least one means for assisting the detection of obstacles, and a central computer which is adapted to drive said command and control means as a function of data received from the obstacle detection assistance means, the method comprising steps of:
- connecting the mobile terminal with the motor vehicle by means of a communication method as mentioned above,
- selection by the user on the mobile terminal of an automatic parking mode of the motor vehicle, and of
- automatic parking of the motor vehicle, during which the computer drives said command and control means as a function of data received from the obstacle detection assistance means.

DETAILED DESCRIPTION OF AN EXEMPLARY EMBODIMENT

The following description in light of the attached drawings, given by way of nonlimiting examples, will give a good understanding as to what the invention consists of and how it can be produced.

Figure 1:
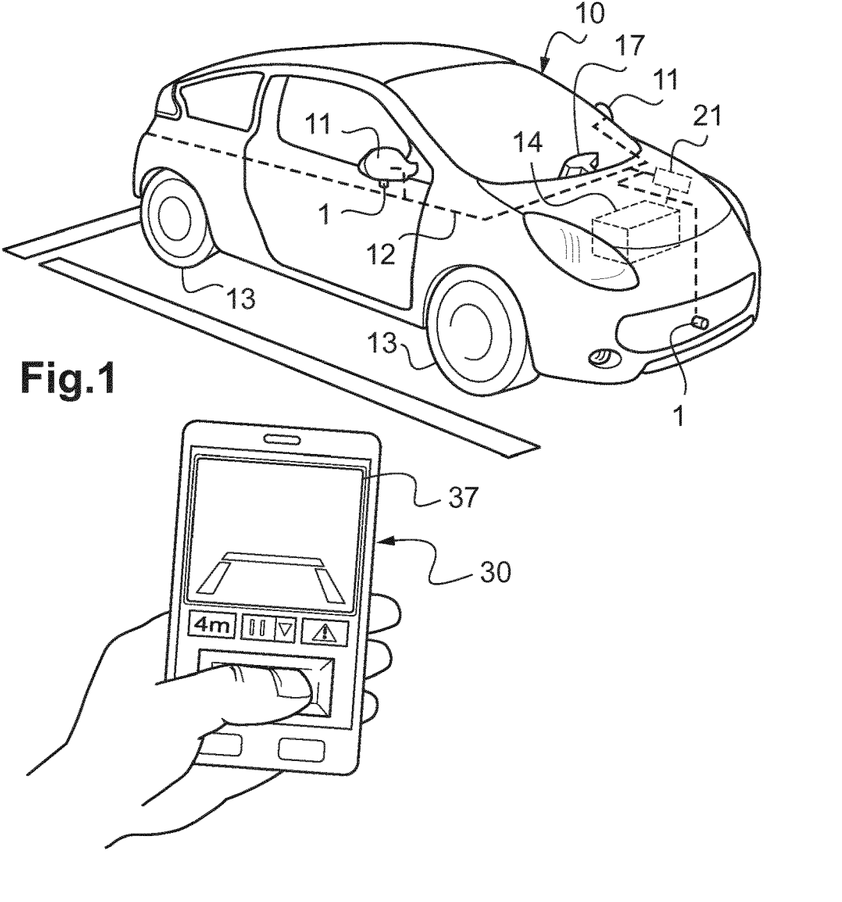
FIG. 1 is a perspective schematic view of a motor vehicle and of a mobile terminal held by the driver of the motor vehicle, FIG. 2 schematically represents components, useful to understanding the invention, of the motor vehicle and of the mobile terminal of FIG. 1.

In the attached drawings:

FIG. 1 shows a motor vehicle 10, here a car comprising four wheels 13, including two front steering wheels.

As a variant, it could be a motor vehicle comprising three wheels, or more wheels.

Conventionally, this motor vehicle 10 comprises a chassis which supports in particular a power train 14 (namely an engine and means for transmitting torque from the engine to the drive wheels), a steering system for varying the angle of orientation of the two front steering wheels, bodywork elements and interior elements.

In FIG. 1, the hand of a user (here the driver of the motor vehicle 10) can also be seen holding a mobile terminal 30.

This mobile terminal 30 is, here, an intelligent portable telephone (or smartphone).

As a variant, it could be any other type of mobile terminal, for example a remote control dedicated to controlling the parking of the motor vehicle 10 or a remote control dedicated to driving various functions of the motor vehicle (locking and unlocking the doors, starting the engine, controlling the parking of the motor vehicle 10, etc.). It could also be a connected watch, a pair of connected glasses or a computer tablet.

Here, and this is, moreover, specifically the object of the present invention, the mobile terminal 30 is provided to communicate with the motor vehicle 10, in particular to allow the driver of the motor vehicle 10 to monitor, from outside the vehicle, the motor vehicle 10 being parked automatically and without problems in a parking space, using this mobile terminal 30.

In the context of the present invention, the motor vehicle 10 comprises an electronic control unit (or ECU), here called central computer 21, which can enter into communication via a wireless link with the mobile terminal 30 in order to exchange data with this mobile terminal 30.

Here, the wireless link for communication between the computer 21 and the mobile terminal 30 is for example of BLE (Bluetooth Low Energy) type. As a variant, it could be any other type of connection, for example Wifi or Bluetooth.

Figure 2:
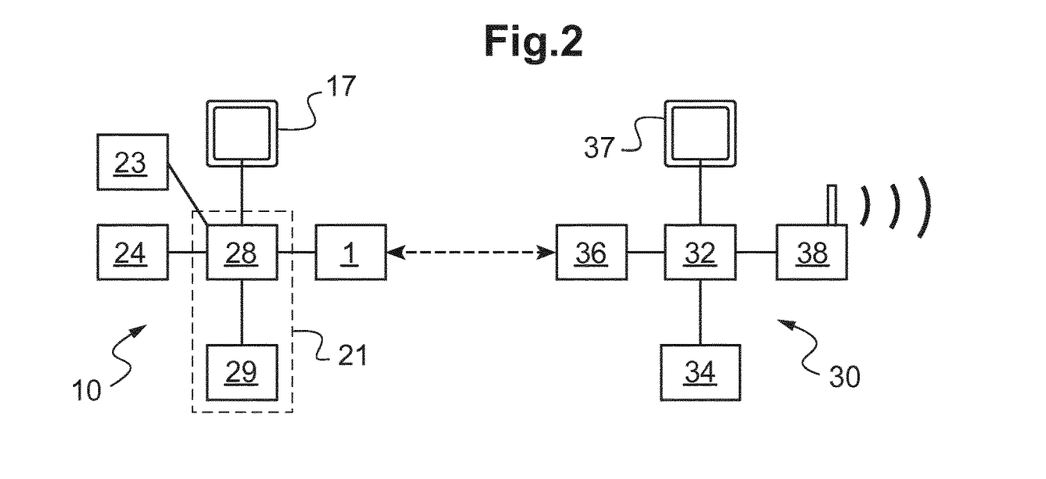

FIG. 2 schematically represents components, useful to understanding the invention, of the motor vehicle 10 and of the mobile terminal 30.

In this FIG. 2, it will be observed that the motor vehicle 10 comprises, in addition to the central computer 21 already mentioned, means 23 for commanding the steering system, means 24 for controlling the power train 14, a touchscreen 17 situated in the interior, and at least one electronic device 1 which will be described in more detail herein below in this explanation.

The command means 23 make it possible to vary the orientation of the steering wheels 13, without intervention from the driver on the steering wheel of the motor vehicle.

The means 24 for controlling the power train 14 are adapted to control in particular the speed of the engine and the gear engaged, without intervention from the driver.

These various components are connected to the central computer 21, for example by a communication network 12, here of BUS-CAN type.

The central computer 21 comprises a processor 28 and a storage unit 29 (see FIG. 2), for example a rewritable nonvolatile memory or a hard disk.

The storage unit 29 stores data used in the context of the method described below, in particular a threshold value. It also stores a computer application, consisting of computer programs comprising instructions whose execution by the processor 28 allows the implementation by the computer 21 of the method described herein below.

The computer 21 is also adapted to drive the command means 23 to control the direction of the vehicle, and the control means 24 for controlling the speed of the vehicle, without intervention from the driver, in order to automatically park the motor vehicle.

As FIG. 2 shows, the mobile terminal 30 comprises, for its part, a processor 32, a memory 34 (for example a rewritable nonvolatile memory), a wireless communication module 36, a module 38 for communication over the mobile telephony network, and a user interface (here a touchscreen 37, but it could be a screen coupled to a keyboard).

The memory 34 in particular allows the mobile terminal 30 to store a user application, intended to facilitate the control of functionalities of the motor vehicle 10 by means of this mobile terminal 30.

The wireless communication module 36 of the mobile terminal 30 makes it possible to establish a wireless link (here of BLE type as already indicated) with the motor vehicle 10, using each electronic device 1 with which this motor vehicle 10 is equipped.

Figures 3, 4A:
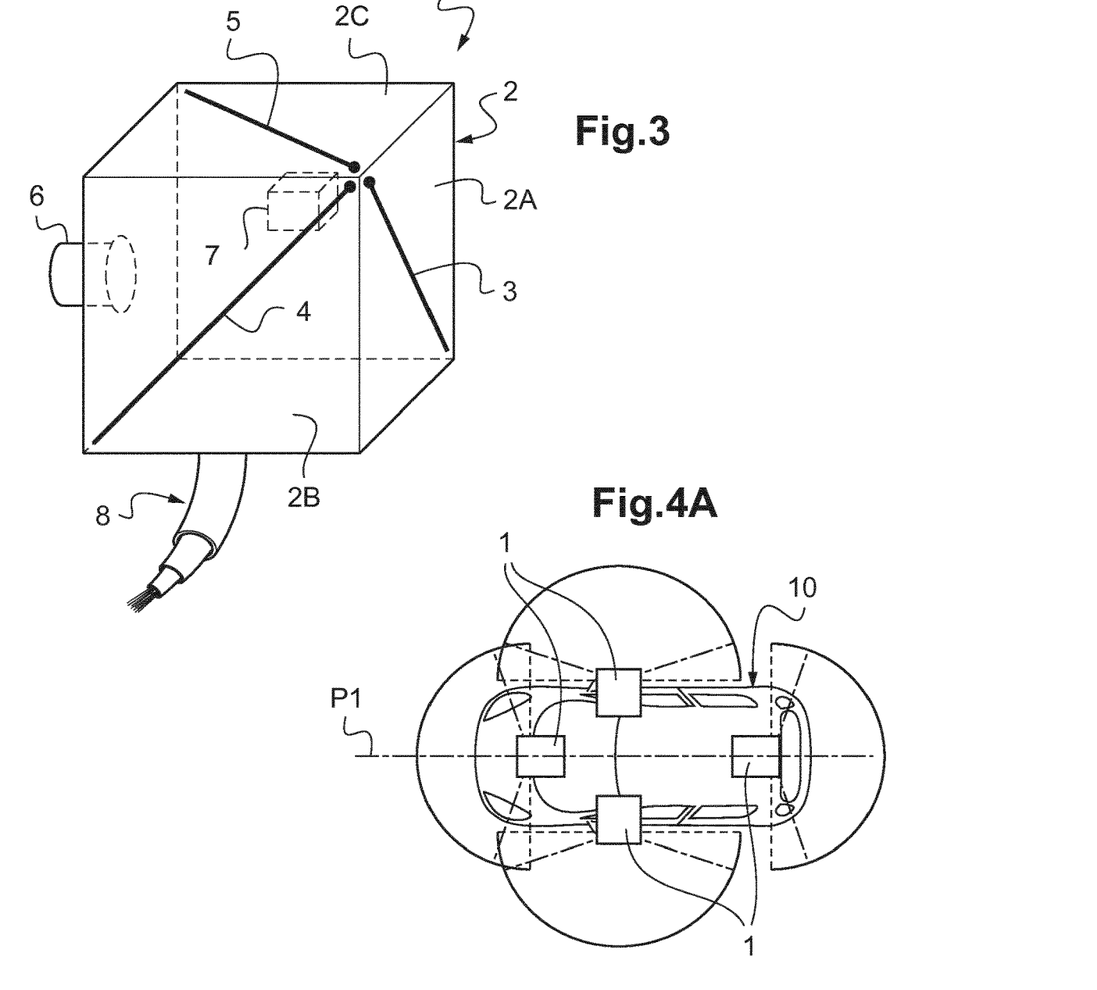
FIG. 3 is a perspective schematic view of an electronic device according to the invention.
FIGS. 4A, 4B and 4C are, respectively, schematic plan, side and front views of the motor vehicle of FIG. 1.

FIG. 3 shows such an electronic device 1.

This electronic device 1 brings together two essential functions for allowing the autonomous parking of the vehicle.

Its first function is to acquire images which, once processed, will allow the central computer 21 to determine the position of the parking space and the position of any obstacles.

Its second function is to allow the central computer 21 to communicate with the processor 32 of the mobile terminal 30, by ensuring a good quality of communication and above all a continuity of the communication throughout the parking operation.

Here, provision is made for the motor vehicle 10 to comprise at least two electronic devices 1 respectively housed in its two external rear view mirrors 11. On this subject, it will be specified that such a rear view mirror will, conventionally, be able to comprise a mirror allowing the driver to view the environment behind the vehicle without having to turn the head excessively. As a variant or in addition, this rear view mirror will be able to comprise a rear view camera, that is to say a camera filming the environment behind the vehicle, so that this environment can be displayed on a screen 17 situated in the interior of the vehicle.

Figure 4B:
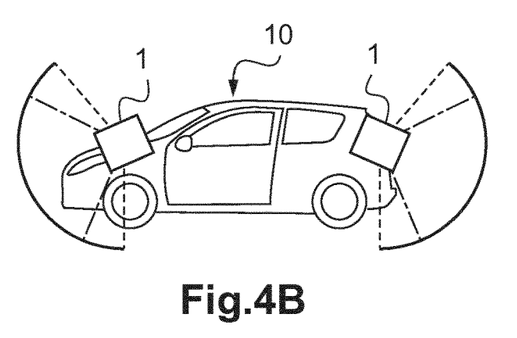
Figure 4C:
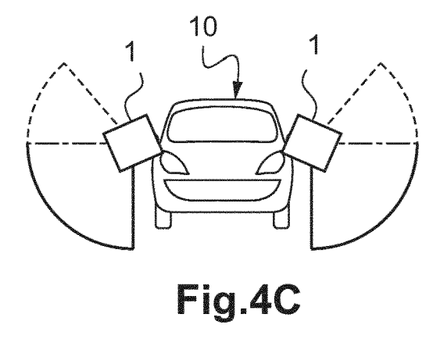

As FIGS. 4A, 4B and 4C schematically show, provision is more specifically given for the motor vehicle 1 to comprise four electronic devices 1, two of which are housed in the two external rear view mirrors 11 and the other two of which are situated at the front and at the rear of the vehicle.

These four electronic devices 1 are preferably situated outside of the interior of the vehicle. They are even advantageously situated on the outside of the metal body of the motor vehicle 10, in order to ensure a good quality of communication.

Thus, the electronic devices 1 situated at the front and at the rear of the vehicle are preferably situated in the front and rear bumpers of the vehicle, for example in proximity to the registration plates.

The communication network 12 of the motor vehicle 10 thus passes via these different positions, so that the electronic devices 1 can all be easily connected thereto.

As FIG. 3 clearly shows, each electronic device 1 comprises a housing 2, preferably of parallelepipedal form.

This housing 2 here has a cubic form. It is produced in a non-metallic material, for example in a plastic material.

It comprises means (not represented) for fixing to the motor vehicle.

The housing 2 bears at least two antennas. In the embodiment represented, it even bears three antennas 3, 4, 5 respectively situated on three of its paired orthogonal faces 2A, 2B, 2C.

Each antenna 3, 4, 5 takes the form of a rectilinear radiating strand. These three antennas extend lengthwise in orthogonal directions.

To allow these antennas to radiate in the desired frequency band (2.4 GHz) even though the housing 2 has a small size (the sides lying between 2 and 4 centimeters), each antenna extends lengthwise along a diagonal of the face of the housing on which it is located.

The housing 2 houses internally, on the one hand, a camera 6, and, on the other hand, an electronic control unit 7.

The camera 6 is conventionally provided to acquire images of the immediate environment of the vehicle. To this end, it comprises a very wide angle lens (of the "fish-eye" type) which protrudes out of the housing 2.

The control unit 7 comprises, for its part, a microcontroller that makes it possible to execute simple instructions solely with a view to setting up a communication between the motor vehicle 10 and the mobile terminal 30.

It is connected to each of the three antennas 3, 4, 5 by a distinct electrical link. It is also designed to be able to transmit and receive signals via each of these antennas, not simultaneously, but rather sequentially, as will be clearly explained herein below in this explanation. In this way, the power of the signal transmitted or received is each time maximum (it is not divided by the number of antennas used).

The electronic device 1 also comprises wired connection means 8, here making it possible to connect the camera 6 and the control unit 7 to the communication network 12.

In this way, the control unit 7 is adapted to communicate not only with the central computer 21, but also with the control units 7 of the other electronic devices 1.

There now follows a description, with reference to FIGS. 4A to 4C, of the orientation of the electronic devices 1 in the motor vehicle 10.

In these figures, the cone of aperture of the field of view of each camera 6 has been represented by chain-dotted lines and the cone of transmission and of reception of signals from the antennas 3, 4, 5 of each unit 2 have been represented by dotted lines.

It can be seen in the figures that the two electronic devices 1 situated in the external rear view mirrors 1 are strictly identical and are placed symmetrically relative to the median plane P1 of the motor vehicle 10.

They are oriented in such a way that the optical axis of the camera 6 and the direction of maximum radiation of the antennas 3, 4, 5 of each of these two electronic devices 1 are situated in a plane orthogonal to the median plane P1 and are inclined downward. This axis and this direction are here inclined relative to one another insofar as the optical axis of the camera 6 is more oriented downward than the direction of maximum radiation of the antennas 3, 4, 5.

The two electronic devices 1 situated at the front and at the rear of the motor vehicle are strictly identical.

They are oriented in such a way that the direction of maximum radiation of the antennas 3, 4, 5 extends along the optical axis of the camera 6, in the median plane P1. Here again, this optical axis is inclined downward.

To sum up, the position of the camera 6 relative to the antennas of the housing 2 is not the same in the electronic devices 1 situated in the external rear view mirrors 11 as in the electronic devices 1 situated at the front and at the rear of the vehicle. The aim is to allow the cameras to acquire images of the immediate environment of the vehicle and the antennas to pick up signals that can come from other directions.

As has been explained above, the benefit of the electronic devices 1 is of allowing the driver to use his or her mobile terminal 30 to control the automatic parking operations of the motor vehicle 10, from the outside thereof.

These operations can thus now be described in detail.

The case that will be considered here is the one in which the driver, after having stopped his or her motor vehicle 10 in proximity to a parking space for example delimited by markings on the ground, exits from the vehicle and wants the motor vehicle 10 to be parked automatically in this parking space, without direct human intervention on the orientation of the steering wheels.

In this case, the driver will however have to watch to see that the motor vehicle 10 is parked in the desired spot, without danger and without impact. It is to facilitate these monitoring operations that the following is implemented.

The method begins before the driver selects, on his or her mobile terminal 30, an automatic parking mode of the motor vehicle 10 or at the time when this mode is selected.

The first operation consists, for the central computer 21 of the motor vehicle, in pairing with the mobile terminal 30, via the wireless link of BLE type.

This operation proceeds in two distinct phases, namely a waiting phase during which the motor vehicle will check whether a mobile terminal is within range of its electronic devices 1, and a communication phase during which the mobile terminal 30 will be able to exchange data with the motor vehicle 10.

During the waiting phase, the control unit 7 of each electronic device 1 transmits successive requests alternately via each of its antennas 3, 4, 5, to try to set up a connection with a mobile terminal situated within range of one of its antennas 3, 4, 5. The signal transmitted by each antenna is, here, called association attempt signal S1.

This association attempt signal S1 is therefore transmitted at regular intervals alternately by the first antenna 3, then by the second antenna 4, then by the third antenna 5 of each electronic device 1.

When it picks up an association attempt signal S1, the mobile terminal 30 is programmed to transmit, in response, another signal, hereinafter called response signal S2. This exchange of signals is standard if referring to the BLE standard.

Since this response signal S2 is transmitted upon reception by the mobile terminal 30 of the association attempt signal S1, it is received by the same antenna of the electronic device 1 as that which had transmitted the association attempt signal S1 picked up by the mobile terminal 30. In the example described here, it will be able to be considered that it is the first antenna 3 of a first of the electronic devices 1.

At this stage, it will be noted that, since the content of the signals exchanged is not the subject of the present invention, it will not be described here in detail. It will be possible to simply specify that the first signals exchanged will comprise cryptological challenges, allowing the motor vehicle 10 to ensure that the mobile terminal 30 is authorized to pair therewith.

Once the mobile terminal 30 is paired, the control unit 7 of the first electronic device 1 will be able to set up a communication tracked with the mobile terminal 30 in order to exchange data making it possible to control the automatic parking of the vehicle, exclusively via its first antenna 3.

It will then be possible, for example because the driver moves around the motor vehicle 10 or because he or she moves his or mobile terminal 30 or because the motor vehicle 10 moves relative to the driver, for the quality of these signals exchanged via this first antenna 3 to be degraded.

To ensure that the antenna used by the motor vehicle 10 to exchange data with the mobile terminal 30 is always the one most likely to ensure a good communication quality, throughout the communication phase, the control unit 7 of the first electronic device 1 implements the following steps.

During a first step, although data are exchanged via the first antenna 3, the control unit 7 continues to transmit successive requests, here called control signals S3, by using the second and the third antennas 4, 5 alternately.

Each time the mobile terminal 30 picks up such a control signal S3, it will be programmed to return a response signal, here called replica signal S4. Since this replica signal S4 is transmitted after reception of the control signal S3 by the mobile terminal, it is received by the same antenna of the electronic device 1 as that which had transmitted the control signal S3 picked up by the mobile terminal 30. In the example described here, it will be possible to consider that it is the second antenna 4 of the first electronic device 1.

When it receives this replica signal S4, the control unit 7 implements a second step.

During this second step, the control unit 7 determines the gain of the replica signal S4. In parallel, it determines the gain of the signal which is exchanged at this instant via the first antenna 3 with the mobile terminal 30 (hereinafter called instantaneous response signal S2').

The gains of these two signals S2', S4 are then compared.

Then, if the gain of the replica signal S4 is substantially greater than that of the instantaneous response signal S2', which means that the second antenna 4 is better positioned relative to the mobile terminal 30 than the first antenna 3 to pick up the signals transmitted by this mobile terminal, the control unit 7 continues the communication with the mobile terminal 30 by no longer using the first antenna 3, but the second antenna 4. Otherwise, it continues the communication with the mobile terminal 30 via the first antenna 3.

"Substantially greater" should be understood to mean that the gain of the replica signal S4 should not be just above that of the instantaneous response signal S2', to avoid having the signal switch over too often between the antennas. It should be greater than the sum of the gain of the instantaneous response signal S2' and a predetermined threshold value. This threshold value is at least equal to 1 dB, for example equal to 10 dB.

Consequently, as long as the gains of the signals received from the second and third antennas 4, 5 are not greater by, for example, more than 10 dB, than the gain of the signal received from the first antenna 3, the communication between the motor vehicle 10 and the mobile terminal 30 is continued via the first antenna 3.

At this stage, it will be understood that when an antenna of a first of the electronic devices 1 has begun to communicate with the mobile terminal 30, the control unit 7 of this first electronic device 1 will continuously check to see if one of its other antennas would not be more likely to ensure a quality connection between the motor vehicle 10 and the mobile terminal 30.

However, it may be that the antennas of this first electronic device 1 are no longer those best placed to communicate with the mobile terminal 30. It may therefore be that another electronic device 1 is better placed to communicate.

Provision is therefore made to continuously check to see if one of the antennas of one of the other electronic devices would not be more likely to ensure a better connection between the motor vehicle 10 and the mobile terminal 30.

For that, the fact that the control units 7 of the different electronic devices 1 of the motor vehicle 10 are able to communicate with one another, via the communication network 12, is exploited.

These checking operations will then be able to be implemented as follows.

During the communication phase, the control unit 7 of each of the electronic devices 1 other than the first electronic device 1 regularly transmits successive control signals S3 via each of its antennas 3, 4, 5.

Then, when a replica signal S4 is received by one of the antennas of a second electronic device 1, one of the control units 7 (or the central computer 21) compares the gain of the instantaneous response signal S2' (the one received via the first antenna 3 of the first electronic device 1) with the gain of this replica signal S4.

Then, the control unit 7 of the second electronic device 1 will be selected to continue the communication with the mobile terminal 30 only if the gain of the replica signal S4 is substantially greater than the gain of the instantaneous response signal S2' (here by more than 10 dB).

These operations therefore make it possible to ensure a continuity of the communication between the motor vehicle 10 and the mobile terminal 30.

Then, since the communication between the motor vehicle 10 and the mobile terminal 30 is indeed set up, the automatic parking of the motor vehicle 10 can be done as follows.

Using the information received from the cameras 6 of the different electronic devices 1, the computer 21 can determine the position of the parking space and the position of any obstacles.

It then drives, according to these positions, the command 23 and control 24 means so that the vehicle is parked autonomously in its parking space. Since this operation of driving of the command 23 and the control 24 means is known to the person skilled in the art and is not in itself the object of the present invention, it will not be described here in more detail.

It will be noted simply that, by virtue of the continuity of the communication set up between the motor vehicle 10 and the mobile terminal 30, the driver will be able to instantaneously command the stopping of these parking operations, for example by simply relaxing the pressure that he or she exerts with his or her finger on the touchscreen 37 of his or her mobile terminal 30.

Once the parking operation is completed, the connection between the mobile terminal 30 and the motor vehicle 10 can be stopped.

The present invention is in no way limited to the embodiment described and represented, but the person skilled in the art will be able to apply any variant thereto conforming to the spirit thereof.

In particular, provision will be able to be made for, during the communication phase, the central computer to measure the gains of the signals received by each of the antennas of the four electronic devices, and for it to deduce therefrom by triangulation an estimation of the position of the mobile terminal relative to the motor vehicle. This position will for example be able to be exploited by the central computer to warn the driver to move if he or she is in the trajectory of the vehicle.

The invention claimed is:

1. An electronic parking assistance device for a motor vehicle, comprising:
   a housing which bears a first antenna;
   a camera which is housed at least partly in the housing; and
   a control unit housed in the housing and which is connected to said first antenna,
   wherein the housing bears at least one other antenna which is connected to the control unit,
   wherein the control unit selects one of the first antenna and the at least one other antenna to transmit and receive signals exclusively via the selected antenna,
   wherein the control unit is configured to communicate with a central computer that controls a direction and a speed of the motor vehicle without an intervention of a driver, and
   wherein the central computer is configured to communicate via the control unit and the selected antenna with a processor of a mobile terminal regarding parking operations.

2. The electronic parking assistance device as claimed in claim 1, in which the housing bears a third antenna which is connected to the control unit so that the control unit transmits and receives signals via the third antenna when the third antenna is selected.

3. The electronic parking assistance device as claimed in claim 2, in which the housing has several orthogonal faces in pairs and in which the first, at least one other, and third antennas are respectively situated on said orthogonal faces.

4. The electronic parking assistance device as claimed in claim 1, in which wired connection means are provided from the camera to a first communication network and from said control unit to a second communication network, combined with or distinct from the first communication network.

5. The electronic parking assistance device as claimed in claim 2, in which each of the first, at least one other, and third antenna takes the form of a rectilinear radiating strand.

6. A motor vehicle comprising:
   two external rear view mirrors;
   a central computer;
   two electronic parking assistance devices as claimed in claim 1, respectively housed in the two external rear view mirrors; and
   a communication network which connects the central computer and the control units of the two electronic parking assistance devices to one another.

7. The motor vehicle as claimed in claim 6, in which each external rear view mirror comprises, in addition to the electronic parking assistance device, a mirror and a rear view camera to acquire images from the rear of the motor vehicle.

8. The motor vehicle as claimed in claim 6, comprising at least one third electronic parking assistance device, the third electronic parking assistance device being situated at the front or at the rear of the vehicle.

9. A communication method from an electronic parking assistance device as claimed in claim 2 to a mobile terminal, comprising two distinct phases, namely:
   a waiting phase during which the control unit of the electronic parking assistance device transmits successive association attempt requests via, alternately, each of the first, the at least one other, and the third antennas, the waiting phase being followed by, as soon as a response signal is received by one of the first, the at least one other, and the third antennas,
   a communication phase during which the control unit communicates with the mobile terminal by using, at least initially, exclusively said one of the first, the at least one other, and the third antenna that receives the response signal.

10. The communication method as claimed in claim 9, in which, during the communication phase:
    the control unit transmits successive control requests via each of the at least one other, and the third antennas other than the first antenna, then, when a replica signal is received by a second of the first, the at least one other, and the third antennas,
    the control unit determines the gain of the instantaneous response signal received from the mobile terminal via said first antenna,
    the control unit compares the gain of the instantaneous response signal and the gain of the replica signal, then
    the control unit continues the communication with the mobile terminal via said second antenna only if the gain of the replica signal is substantially greater than the gain of the instantaneous response signal.

11. The communication method as claimed in claim 9, applied to a motor vehicle, in which, while in the communication phase the control unit of a first of the electronic parking assistance devices communicates with the mobile terminal via one of the first, the at least one other, and the third antennas:
    the control unit of each electronic parking assistance device transmits successive control requests via each of the at least one other, and the third antennas other than the first antenna, then, when a replica signal is received by a second of the antennas of the second electronic parking assistance device,
    the control unit of the first electronic parking assistance device ROM determines the gain of the instantaneous response signal received from the mobile terminal via said one of the first, the at least one other, and the third antenna,
    the control unit of at least one of the electronic parking assistance devices compares the gain of the instantaneous response signal and the gain of the replica signal, then
    the control unit of the second electronic parking assistance device continues the communication with the mobile terminal via said second antenna only if the gain of the replica signal is substantially greater than the gain of the instantaneous response signal,
    wherein the motor vehicle comprising:
      two external rear view mirrors;
      a central computer;
      the first electronic parking assistance device and the second electronic parking assistance device, respectively housed in the two external rear view mirrors; and
      a communication network which connects the central computer and the control units of the two electronic parking assistance devices to one another.

12. The communication method as claimed in claim 10, in which, during the communication phase, there is provided a step of estimation of the position of the mobile terminal, as a function of which antenna is used and as a function at least of the gain of the instantaneous response signal.

13. A method for interactive control of the automatic parking of a motor vehicle as claimed in claim 6 in a parking space by means of a mobile terminal, said motor vehicle comprising:

means for commanding the orientation of the wheels of the motor vehicle, means for controlling a power train of the motor vehicle, at least one means for assisting in the detection of obstacles, and a central computer which is adapted to drive said command and control means as a function of data received from the obstacle detection assistance means, the method comprising:

connecting the mobile terminal with the motor vehicle by a communication method comprising:

a waiting phase during which the control unit of the electronic parking assistance device transmits successive association attempt requests via, alternately, each of the first, the at least one other, and the third antennas, the waiting phase being followed by, as soon as a response signal is received by one of the first, the at least one other, and the third antennas, a communication phase during which the control unit communicates with the mobile terminal by using, at least initially, exclusively said one of the first, the at least one other, and the third antenna that receives the response signal;

selection by the user on the mobile terminal of an automatic parking mode of the motor vehicle; and automatic parking of the motor vehicle, during which the computer drives said command and control means as a function of data received from the obstacle detection assistance means.

* * * * *